Figure 1:
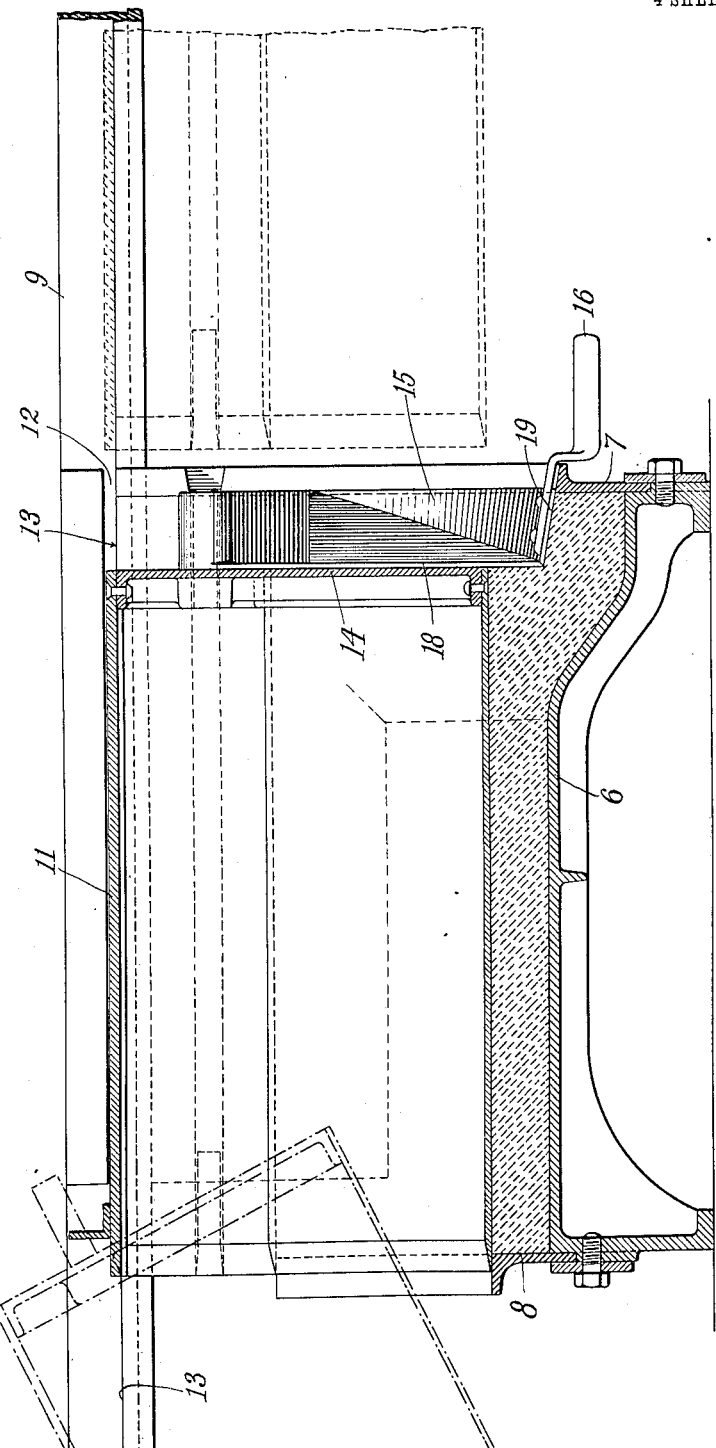

No. 852,029. PATENTED APR. 30, 1907.
J. C. MITCHELL.
APPARATUS FOR MAKING SECTIONAL PIPES OR CONDUITS.
APPLICATION FILED JULY 19, 1906.

4 SHEETS—SHEET 1.

No. 852,029. PATENTED APR. 30, 1907.
J. C. MITCHELL.
APPARATUS FOR MAKING SECTIONAL PIPES OR CONDUITS.
APPLICATION FILED JULY 19, 1906.

4 SHEETS—SHEET 2.

No. 852,029. PATENTED APR. 30, 1907.
J. C. MITCHELL.
APPARATUS FOR MAKING SECTIONAL PIPES OR CONDUITS.
APPLICATION FILED JULY 19, 1906.
4 SHEETS—SHEET 3.
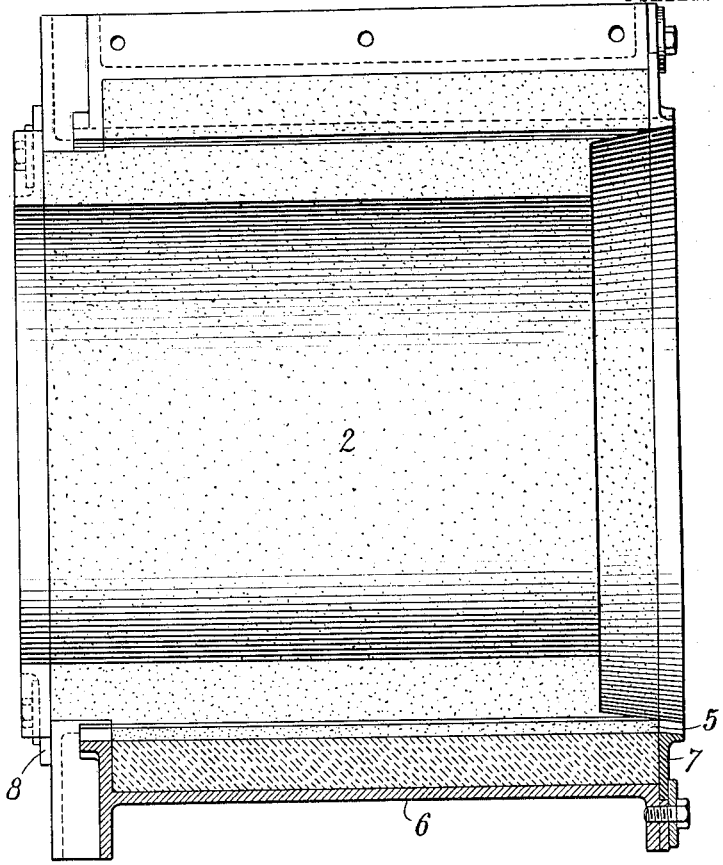
Fig. 4
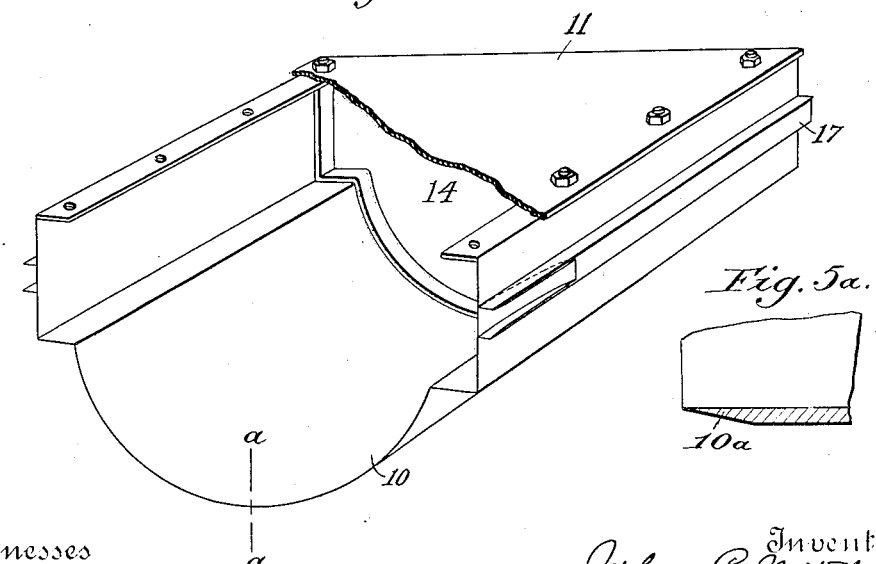
Fig. 5
Fig. 5a.
Witnesses
Inventor
John C. Mitchell
By his Attorneys
Kerr, Page & Cooper.

No. 852,029.  
PATENTED APR. 30, 1907.  
J. C. MITCHELL.  
APPARATUS FOR MAKING SECTIONAL PIPES OR CONDUITS.  
APPLICATION FILED JULY 19, 1906.

4 SHEETS—SHEET 4.

Witnesses  
Raphael Netter  
Arthur E. Mahom

Inventor  
John C. Mitchell  
By his Attorneys  
Kerr, Page & Cooper

UNITED STATES PATENT OFFICE.

JOHN C. MITCHELL, OF NEWPORT NEWS, VIRGINIA, ASSIGNOR TO LOCK JOINT PIPE COMPANY, A CORPORATION OF NEW JERSEY.

APPARATUS FOR MAKING SECTIONAL PIPES OR CONDUITS.

No. 852,029.　　　　　Specification of Letters Patent.　　　　　Patented April 30, 1907.

Application filed July 19, 1906. Serial No. 326,937.

*To all whom it may concern:*

Be it known that I, JOHN C. MITCHELL, a citizen of the United States, residing at Newport News, in the county of Warwick and State of Virginia, have invented certain new and useful Improvements in Apparatus for Making Sectional Pipes or Conduits, of which the following is a specification, reference being had to the drawings accompanying and forming a part of the same.

The invention which forms the subject of this application for Letters Patent is embodied in an apparatus devised by me for the manufacture of the sectional pipes or conduits set forth in Letters Patent of the United States No. 798,486, granted August 29, 1905, to Philip Aylett. These pipes are composed of laterally and longitudinally separable sectional units, with ends and edges adapted to form scarf-joints and provided with grooves along their contiguous edges to form keyways when the units are assembled. These pipes are usually made of cement or other plastic substance in sectional molds, but as their peculiar conformation requires the employment of molds composed of numerous sections, considerable difficulty and expense are involved in their manufacture by such process. It was with a view to minimizing these objections that I devised the method of and means hereinafter described for making these pipe sections, but from the nature of the improvements and of the articles produced, it will be seen and understood that the invention is applicable generally to the manufacture of other forms of pipe or similar articles from plastic substances.

The improvements comprise broadly, as a means for shaping and finishing a pipe section or the like, a matrix or mold for receiving the plastic material and imparting thereto the desired exterior conformation, and a die adapted to be moved longitudinally across and partly through the matrix for displacing so much of the plastic material as will impart the desired interior conformation to that which remains and is permitted to set or harden. The peculiar shape of the special product which is contemplated herein, however, necessitates certain details of construction and design which will be described in full by reference to the accompanying drawings.

Figure 2:
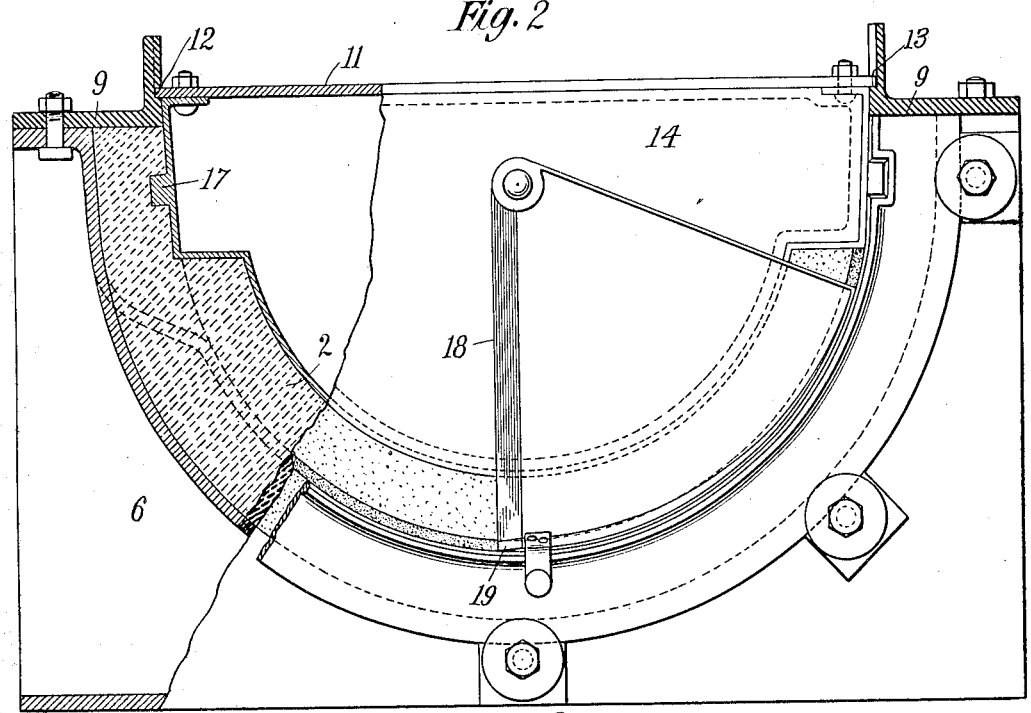
Figure 3:
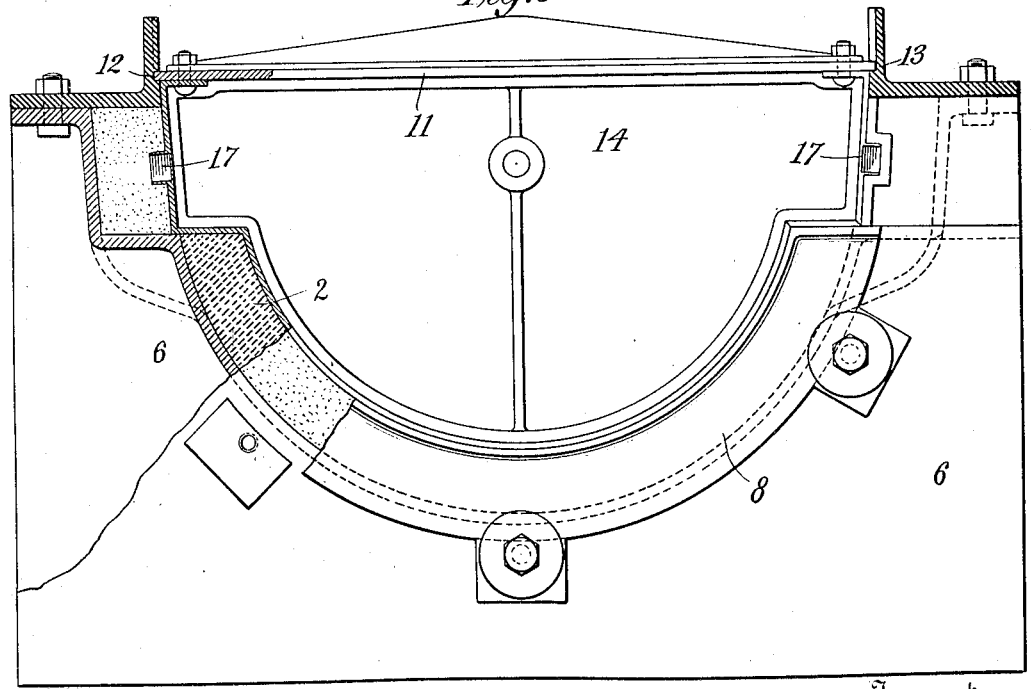
Figure 6:
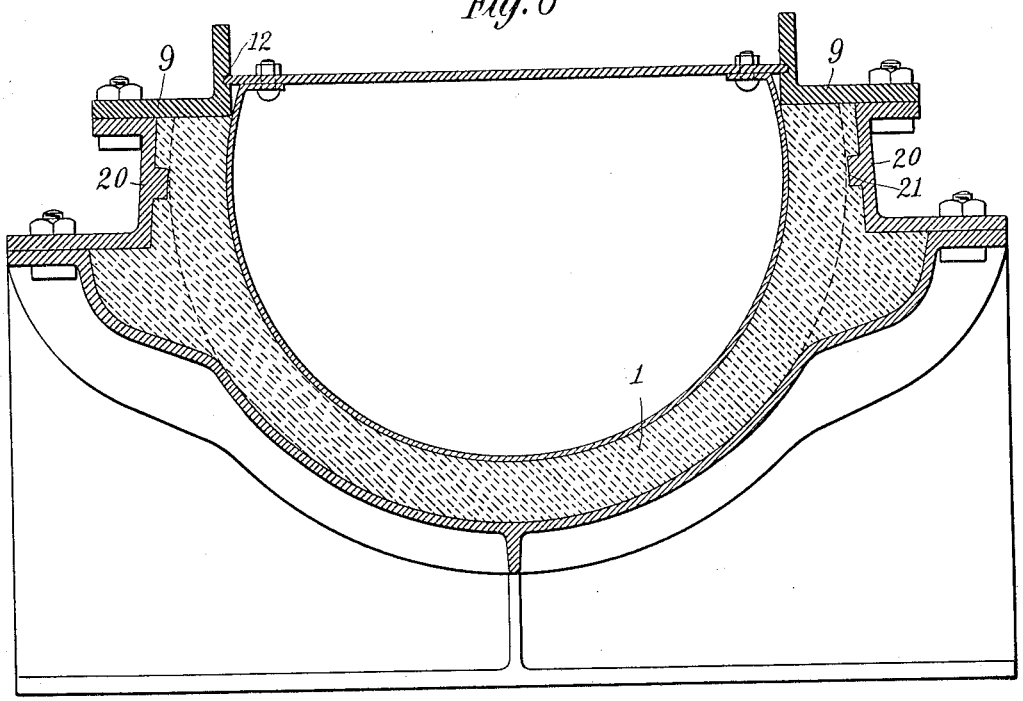
Figure 7:
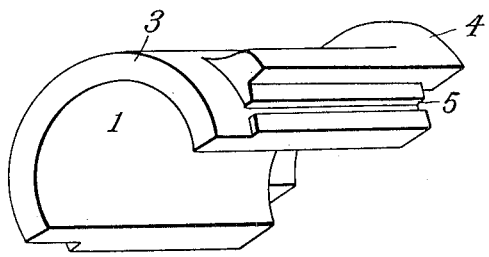
Figure 8:
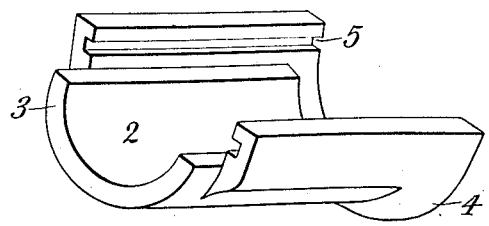

Figure 1 is a longitudinal central section of my improved apparatus in its entirety, for forming one of the types of unit of a sectional pipe. Fig. 2 is an end elevation and part section of the same as viewed from the right of Fig. 1. Fig. 3 is a similar view from the opposite side of the same figure. Fig. 4 is a top plan view of Fig. 1, with the movable die or cutter and certain other parts removed. Fig. 5 is a perspective view of the die or cutter with a portion of the top broken away. Fig. 5$^a$ is a detail sectional view of the cutting edge of the die or cutter, on line $a$—$a$ of Fig. 5, showing the cutting edge formed to compact the material and give a smooth finish to its surface. Fig. 6 is a central transverse section of the means for forming the second type of pipe unit. Figs. 7 and 8 are perspective views of the two types of unit which make up the pipe when properly assembled.

Referring to the last named figures, 1 and 2 represent, respectively, the male and female sections or units, which, when assembled, make up a length of pipe with spigot and bell ends 3 and 4. The longitudinal edges of the sections are fashioned, either in the special manner shown or otherwise, to form scarf joints, in the contiguous faces of which are grooves 5, which provide key ways when the sections are assembled for the reception of suitable keys that lock the sections together. Considering first the form of units shown in Fig. 8, the apparatus for making it is as follows:

A mold or matrix is built up, preferably of metallic sections having a main body 6, detachable end plates 7, 8, and similarly detachable plates 9 for the longitudinal edges. These parts, when assembled, form an open mold of the contour desired for the exterior of the pipe section 2.

A plastic cement or concrete is introduced and packed in this mold by means of suitable tools, it being immaterial how much of the central space is filled, provided the walls of the mold are lined with a layer, preferably somewhat thicker than the finished pipe.

Before the material has set or hardened a cutter or die is run into or through the mold which imparts the proper conformation and finish to the inner surface of the plastic material. This device is shown in Fig. 5, and consists of a rigid cutter 10, generally of steel, cast or pressed to the form required for the inner surface of the pipe section.

The upper edges of the cutter 10 are secured to a rigid plate 11, the longitudinal edges of which project as shown, and the faces of the detachable edge plates 9, of the mold, are formed or provided with suitable grooves in which the said edges engage when the cutter is passed through the mold. In practice I have found it sufficient and desirable to provide a groove 12 in one plate 9, and a ledge or shoulder 13 on the other to facilitate the removal of the cutter from the mold at any point in its travel. By forcing this cutter through or across the mold, either by hand or by power, the unnecessary material is sheared off and removed by the cutter, while that remaining is in the exact form required for the pipe section, except at the rear or bell end, which is then finished by the following means: To a cross-bar or brace 14 at the rear end of the cutter 10 is pivoted a rotary plate 15 operated by a handle 16, and constituting a wiper or wiping knife. When the cutter 10 has been forced to a predetermined point into and through the mold, this wiper is partially rotated by the handle 16, to remove the excess of material and form the inner stepped surface of the bell, as indicated in Fig. 1. After these operations have been effected the cutter with its appurtenances is removed from the mold, and the fashioned material therein allowed to set or harden, when, by the removal of the detachable plates 7, 8, 9, the finished pipe section may be removed.

For the proper solidification and finish of the surfaces formed by the shearing action of the cutter 10 and wiper 15, it is desirable, and in many cases practically necessary, that the sheared surface of plastic material should be smoothed or compacted by an operation similar to that of a mason's trowel. For example, if this is not done in forming the elements of the scarf joints containing the grooves 5, or in finishing the bell ends, these parts are liable to fracture. I provide therefore for such a finish wherever it may be found desirable.

To form the grooves 5, strips of suitable material 17 are secured to the sides of the cutter 10, and the forward ends of these strips are beveled off between two side walls, as shown in Fig. 5, so that as the cutter enters the mold the plastic material will be displaced and compacted by the strips 17, to form the grooves. The same result on the rest of the inner surface of the pipe section is secured by beveling or inclining the shearing edge of the cutter, as shown at 10ª in the detail sectional view, Fig. 5ª, so that, in addition to its cutting or shearing action, it will compress and smooth the surface over which it passes. In Figs. 1 and 2 the wiper 15 is shown as provided with inclined or upturned edges 18, 19, for the same purpose.

As each length of pipe is composed of two sections or units of slightly different conformation to enable them to match, the mold and cutter for each will be correspondingly formed. For example, to produce the male section, shown in Fig. 7, these parts will be made as illustrated in Fig. 6. In this case, in addition to the removable plates 9, along the top edges of the mold, it is necessary to employ removable plates 20, which form the stepped outer portions of the scarf joints. These plates are provided with ribs 21, which form the grooves 5 of Fig. 7, while the cutter 10 is of substantially semi-circular form, to conform to the contour of the inner surface of the sectional unit 1.

In the above illustration of my invention I have shown the detachable plates 7, 8 and 9 as a part of the mold, and in practice it is much more convenient to make them so, particularly as the plates 9 have the added function of producing guide ways for the cutter to slide in, but it is evident that any portion of the surfaces of the pipe section shown as formed by the said plates may be formed by the cutter by a proper alteration in the form of the latter, and that in so far as the plates serve as guide ways their arrangement or manner of support may be indefinitely varied.

By the use of the apparatus above described the manufacture of pipe sections of this description may be very greatly facilitated, for, in lieu of having a complete sectional mold for each unit, any number of open or partial molds may be used with one cutter. In the case of closed or complete molds, also a long time is required for the material to harden, but by my improvements this part of the process is effected in much shorter time.

Having now described my invention, what I claim is:

1. An apparatus for the manufacture of pipe sections of the kind described from plastic substances comprising, in combination, an open mold having a contour corresponding to that required for the exterior of the pipe section, and a die or cutter conforming to the contour of the inner surface of the pipe section and movable across and through the mold to shear off and remove the material therein in excess of that filling the space between mold and the cutter and having its shearing or cutting edge formed to compact the material filling the said space, as set forth.

2. An apparatus for the manufacture of pipe sections of the kind described, from plastic substances, comprising, in combination, an open mold with detachable sections at its ends and edges, and having a contour corresponding to that required for the exterior of the pipe section, and a die or cutter conforming to the contour of the inner surface of the pipe section and movable across and through the mold to shear off and remove the material therein in excess of that filling the space between the mold and cutter and having its shearing or cutting edge formed to compact the material filling the said space, as set forth.

3. An apparatus for the manufacture of pipe sections of the kind described, from plastic substances, comprising, in combination, an open mold having a contour corresponding to that required for the exterior of the pipe section, a die or cutter conforming to the contour of the inner surface of the pipe section, except at the bell end, and movable across and through the mold to shear off and remove the material in excess of that filling the space between the cutter and the mold, and a rotary wiper carried by the cutter for fashioning the inner surface of the bell end, as set forth.

4. The combination with an open mold of longitudinal guides in fixed relation thereto, and a cutter conforming to the contour of the inner surface of the article to be molded and movable along said guides for shearing off and removing material from the mold in excess of that filling the space between the cutter and mold, the shearing or cutting edge of the cutter being formed to compact the material filling the said space, as set forth.

5. An apparatus for the manufacture of pipe sections of the kind described, from plastic material, comprising, in combination, an open mold having a contour corresponding with that required for the exterior of the pipe section, and a cutter or die conforming to the contour of the inner surface of the pipe section and movable across and through the mold in fixed relation thereto, the entering edges of the cutter being inclined so as to shear off and remove from the mold less than the total excess of material normally filling the space between the cutter and mold and compact the material remaining in the mold, as set forth.

6. An apparatus for the manufacture of pipe sections of the kind described, from plastic material, comprising, in combination, an open mold having a contour corresponding with that required for the exterior of the pipe section, and a cutter or die conforming to the contour of the inner surface of the pipe section and movable across and through the mold in fixed relation thereto, the entering edges of the cutter being of smaller diametrical dimensions than the body of the same, whereby the material not sheared off and removed by the cutter will be compacted in the mold, as set forth.

7. The combination with an open mold, a cutter movable across and through the same, the mold and cutter being so related that the space between them corresponds in shape to that required in the article to be molded, a rotary wiper pivoted to the rear end of the cutter and adapted to form and finish the end portion of said article when the cutter has been forced to a given point in said mold, as set forth.

8. The combination with an open mold having longitudinal detachable plates 9, formed or provided with guides, a cutter 10 having projecting edges or flanges for engaging with the guides, and a rotary wiper 15 pivoted to the rear of the cutter, as and for the purpose set forth.

JOHN C. MITCHELL.

Witnesses:
M. LAWSON DYER,
JOHN C. KERR.